Oct. 5, 1965  M. B. GLASER ETAL  3,209,745
SNOW MELTING METHOD AND APPARATUS
Original Filed June 28, 1961  6 Sheets-Sheet 1

Marvin B. Glaser
Frederick H. Peper
Charles W. Foust
William S. Luring

Inventors

By W. O. T Heilman  Attorney

Marvin B. Glaser
Frederick H. Peper
Charles W. Foust
William S. Luring

Inventors

By W.V. Heilman  Attorney

Oct. 5, 1965 M. B. GLASER ETAL 3,209,745
SNOW MELTING METHOD AND APPARATUS
Original Filed June 28, 1961 6 Sheets-Sheet 3

Marvin B. Glaser
Frederick H. Peper
Charles W. Foust
William S. Luring

Inventors

By W.O. T Heilman  Attorney

Oct. 5, 1965     M. B. GLASER ETAL     3,209,745
SNOW MELTING METHOD AND APPARATUS
Original Filed June 28, 1961     6 Sheets-Sheet 4
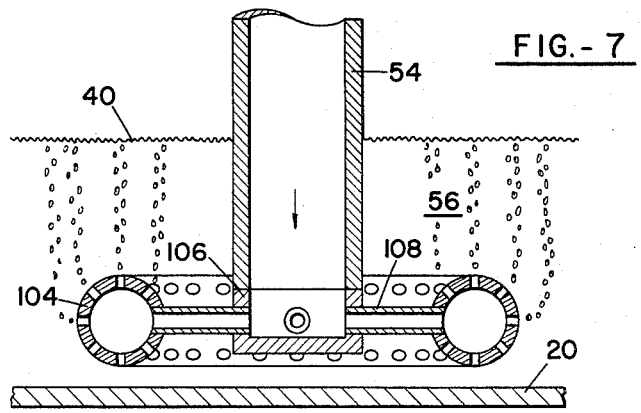
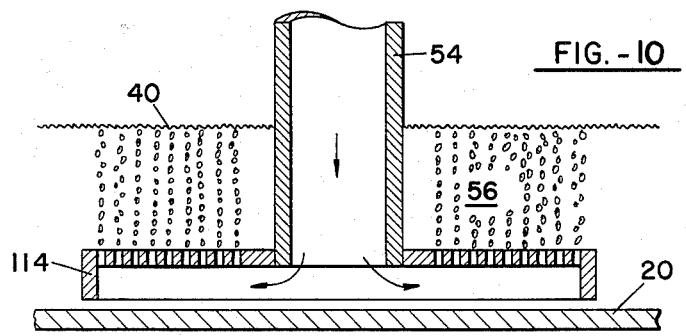
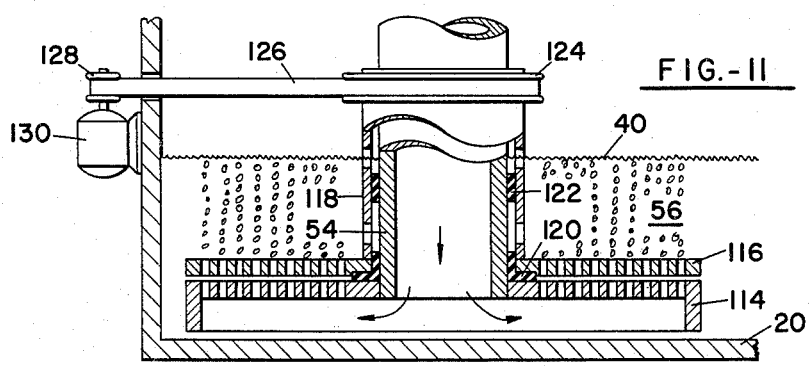
Marvin B. Glaser
Frederick H. Peper
Charles W. Foust
William S. Luring
Inventors
By W. O. T. Heilman     Attorney Oct. 5, 1965     M. B. GLASER ETAL     3,209,745

SNOW MELTING METHOD AND APPARATUS

Original Filed June 28, 1961     6 Sheets-Sheet 5

Marvin B. Glaser
Frederick H. Peper
Charles W. Foust
William S. Luring

Inventors

By W. O. T Heilman     Attorney

Marvin B. Glaser
Frederick H. Peper
Charles W. Foust
William S. Luring

United States Patent Office 3,209,745
Patented Oct. 5, 1965

3,209,745
SNOW MELTING METHOD AND APPARATUS
Marvin B. Glaser, Scotch Plains, Frederick H. Peper, Fords, and Charles W. Foust, Berkeley Heights, N.J., and William S. Luring, New York, N.Y., assignors to Esso Research and Engineering Company, a corporation of Delaware
Filed June 14, 1962, Ser. No. 205,481
5 Claims. (Cl. 126—343.5)

This application is a continuation-in-part of application Serial No. 745,934, filed July 1, 1958.

The present invention relates to a method and apparatus for melting snow, ice, and analogous forms of congealed liquid. It has particular application to the melting and disposition of snow in city streets, parking lots, airport runways and other situations where large volumes of snow (or ice, hail, etc.) must be disposed of rapidly and economically. The invention may have application to the melting of other congealed materials to their natural liquid states. Hereinafter, when mention is made of snow melting, it will be understood that melting of hail, slush, ice, etc. is considered generally to be equivalent.

The removal of snow, ice, etc. from streets, highways, airport runways, and the like often presents a serious problem. Sewers are often inadequate, where available at all, to handle large volumes of snow, and hauling snow considerable distances to dumping areas is expensive in manpower and equipment. Various proposals have been made in the past for reducing snow and ice to the liquid state by local application of heat, but such have not been widely used because of cost. Attempts have been made to melt snow by direct impingement of flames or combustion gases, use of steam, etc. In U.S. Patent No. 663,718, issued in 1900, an interesting proposal was made whereby the combustion products from a burner were to be brought, before release to the atmosphere, into direct contact with water in a tank. Snow was to be dumped into the tank and melted by the water, the water receiving heat directly from the gases. This patent suggests heating the water to comparatively high temperature, suggesting that additional snow may be disposed of by placing it in water flowing away from the melting tank. The present invention involves a number of improvements over that described in said Patent 663,718. It is a particular object of this invention to make a very much more efficient use of the principle of submerged combustion to obtain a vastly increased or near maximum of snow melting from a given fuel expenditure.

According to the present invention, the gases of combustion are directly and immediately mixed with the water before any substantial loss of heat. They achieve their major warming effect on the water in the course of passing through it and not, to any substantial extent, by heat transfer through an interposed solid medium such as a vessel wall or pipe wall. Moreover, a very high proportion, e.g., 95% or more, of the total available heat is transferred by bringing gases at high temperature to substantial temperature equilibrium with the water into which snow is charged for melting. The process is kept efficient by the further step of limiting the maximum water temperature, preferably to within a few degrees, e.g., 20° F. or so, of the snow melting point in normal operation. Water volume is limited to that required for disposing of snow at an adequate rate, this volume providing a heat sink for operating burners during momentary discontinuity in snow delivery.

With the apparatus and method of the present invention, volumetric efficiency is extremely high. It is evident that the volumetric rate of heat transfer from gas to water, while tending intrinsically to be high because of direct contact of the two materials, also will be a function of the intimacy of mixing and of the size of the gas bubbles. Intimate mixing caused by highly turbulent flow conditions and large values of gas surface to volume ratio resulting from relatively small bubbles, which give up all or substantially all their heat to the water before emergence, will both tend to increase the rate of heat transfer per unit volume of the melter. Likewise, regarding the second step of the process, that is, heat transfer from water to snow, high rates are enhanced with decreasing sizes of snow particles as well as with good mixing.

One important object of this invention is to design a melting apparatus and method having a particularly high volumetric rate of heat transfer. Very nearly all the available heat of combustion is utilized to melt the congealed product. Another is to provide an apparatus of unitary construction suitable for use either on a vehicle or in a stationary location such as a subsurface pit. Still another involves controlled and substantially concurrent withdrawal of water while restraining withdrawal of congealed material to maintain a substantially constant liquid level. Other objects will appear below.

Reference will now be made to the accompanying drawings wherein:

FIG. 7 represents a view in sectional elevation through the lower end of a combustion gas flue provided with a sparger for generating and distributing gas bubbles.

FIG. 10 represents a view in sectional elevation through the lower end of a combustion gas flue provided with an external, perforated, and sensibly rigid plate for generating and distributing gas bubbles.

FIG. 11 represents a view in sectional elevation through the lower end of a combustion gas flue provided with an external, perforated and sensibly rigid plate for generating and distributing gas bubbles, and which is provided further with a second perforated plate supported in bearings above said first-mentioned plate which may be rotated for slicing the gas bubbles formed initially into bubbles of smaller size upon final release.

Figure 12:
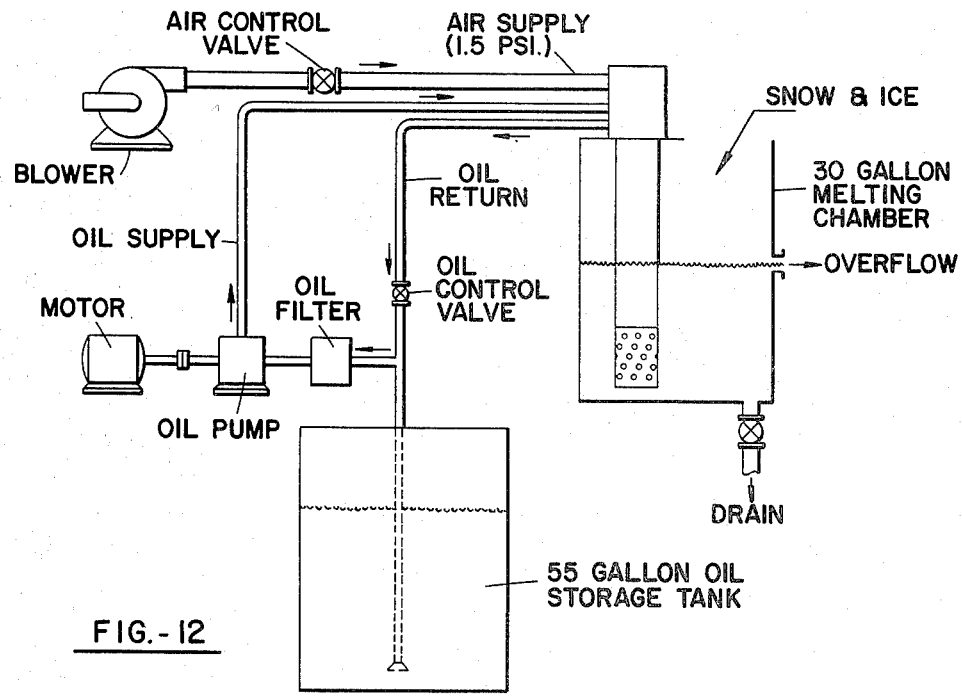

FIG. 12 represents a diagrammatic view of a snow melter and associated equipment constructed and connected as an apparatus embodiment of this invention.

Figure 13:
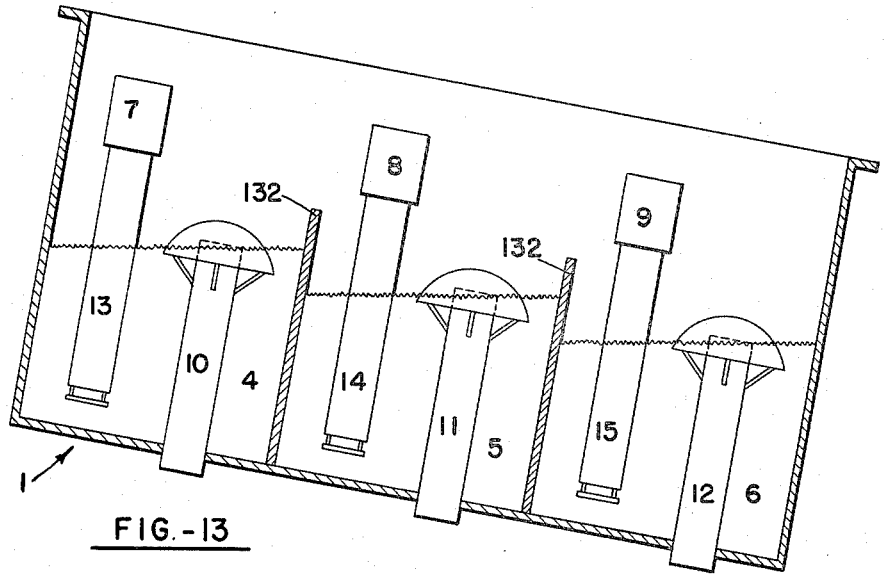

FIG. 13 represents a view in sectional elevation through the melting chamber of an apparatus embodying this invention, showing internal compartmentation and multiple combustor and flue and water drawoff pipe arrangements for operation of the apparatus in a tilted attitude.

Figure 1:
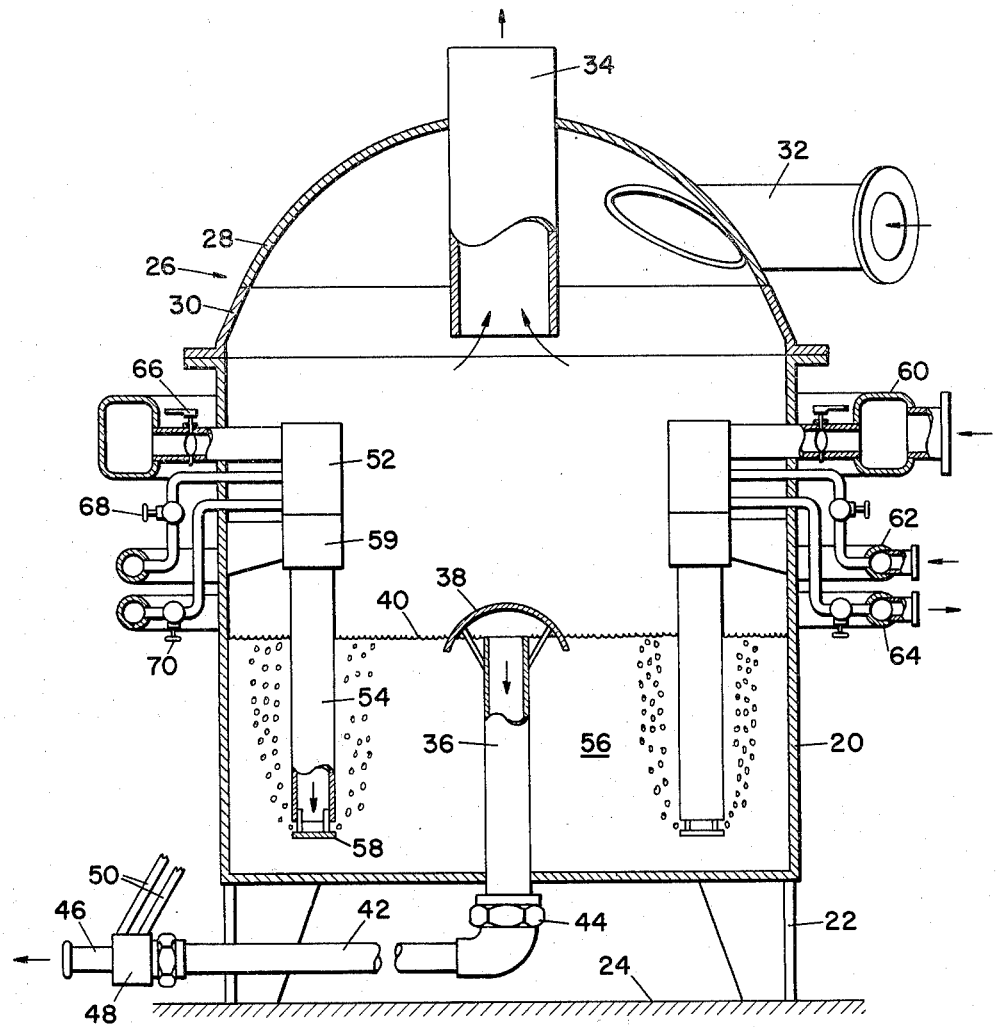
FIG. 1 represents a view in sectional elevation through the melting chamber and snow blower inlet hood of an apparatus embodiment of this invention showing certain internal and external fittings thereof including combustor units, combustion gas flue and distributor units, supply lines for air, fuel and snow, and a water drawoff and liquid level regulating pipe.

Referring now to FIG. 1, 20 designates a melting chamber of rectangular plan for purposes of the illustrated embodiment of this invention. It is provided with support legs 22 which bear on structure 24. This structure may be the bed of a vehicle, street or sidewalk paving, or any earth surface on which it may be convenient to locate the melter. So far as mobile installation is concerned, the melting chamber may be integral if desired with a vehicle, in which case legs 22 may be eliminated.

For use with snow gathering and blowing equipment, the apparatus may be covered as seen in FIG. 1. Surmounting the melting chamber is a hood 26 which comprises a dome-like upper member 28 and a lower member 30 which is configured as an adapter to the melting chamber. This adapter and the melting chamber are provided with mating flanges or other suitable joining means. A snow entry pipe 32 pierces the upper member of the hood tangentially, and a gas exhaust pipe 34 rises vertically through the hood. The lower end of the snow exhaust pipe 34 is below the inside opening of snow entry pipe 32.

Within the melting chamber there is a vertical pipe 36 which serves as a water drawoff and liquid level controller. This pipe may be continued in any convenient way outside the chamber, and be provided with suitable means for connection of a hose or any other extension. At its upper end within the melting chamber drawoff pipe 36 is provided with a snow restraining cap 38, shown in section, to prevent plugging of the pipe by unmelted snow, ice, or other solid debris. The limiting water level maintained by pipe 36 is designated 40.

Considering particularly a vehicular installation of the snow melter of this invention, a hose 42 is joined to the outside end of drawoff pipe 36 by a coupling 44. This hose terminates in a discharge fitting or nozzle 46 which may be supported in a collar 48, which is in turn supported by struts 50 running back to the vehicle conveying the melter or to the melting chamber itself. These struts desirably are both extensible and rotatable to allow discharge of water from nozzle 46 over a range of distances and directions from the vehicle.

Inside the melting chamber there is at least one heating means comprising a combustor 52 located above the limiting liquid level 40, and a flue 54 extending downwardly from the combustor past level 40 into the body of heat transfer water 56. Two heater units are shown in FIG. 1. The combustor 52 and flue 54 together may be considered a burner housing located partly above and partly below the operating water level. Gases of combustion passing down the flue may be projected directly into the water body. Desirably however, they also will be somehow distributed radially from the flue. In FIG. 1, 58 designates a plate suspended fairly closely below the lower end of the flue 54, creating a circumferential aperture through which combustion products will be ejected with some component of velocity transverse to the flue axis. This helps control bubble size so that they are small enough to reach substantial temperature equilibrium with the water by the time they reach its surface. The water temperature is normally kept within a few degrees, preferably not more than about 20° F. above the melting point, i.e., above 32° F.

Combustor 52 may be of any appropriate kind. An oil-fired device is preferred, but this invention does not preclude the use of combustible materials other than oil. Support for each combustor and flue assembly is provided by a bracket 59 extending from the inner wall of the melting chamber.

Surrounding melting chamber 20 are manifolds 60, 62 and 64 which provide respectively for air supply to, oil supply to, and oil return from combustors 52 to which they are joined by appropriate connectors. These manifolds are fed by and feed back to appropriate blowers, pumps, and reservoirs not shown. A throttle or damper 66 is provided in the air line to each combustor. Likewise, valves 68 and 70 are installed in the combustor oil supply and return connectors.

The operation of the apparatus of FIG. 1 will now be considered. The rectangular shape of melting chamber 20 which has been shown, will make for economical utilization of space aboard a vehicle. In addition to the melter illustrated, the vehicle will normally carry auxiliary apparatus, not shown, including an air blower, a fuel storage tank and reservoir, a fuel pump, and associated piping and controls. The vehicle carrying the melter may also carry the snow gathering and blowing equipment. The discharge means of this equipment may be connected to snow entry pipe 32 when the hood 28 is in use.

In operation, melting chamber 20 will be charged with water to the level 40, or at least sufficient to cover the gas outlets. Combustors 52 of a number capable of melting snow at the anticipated rate of delivery will be ignited. For these combustors the corresponding air dampers 66 will be opened, as well as the fuel supply and return valves 68 and 70.

It is a requirement of this invention that air supplied to the active combustors be at pressure sufficient not only for combustor operation, but also to depress the column of water which will otherwise rise in flue 54 to the lower end of the flue, so that products of combustion may escape between the end of the flue and plate 58. Air pressure should not, on the other hand, be so high as to agitate unduly the liquid contents of the melting chamber, particularly not when hood 26 is removed. Effective air pressure at the combustor flame and in the flue may be regulated by damper 66.

Once the combustors have been ignited, hot gaseous products of combustion will rush down flue 54, and, forcing their way out between the end of the flue and plate 58, appear as bubbles in the body of water 56, heating this water by direct contact. After rising to and through the surface 40 with considerable water turbulence, the combustion gases will finally escape from the snow melter. When the melting tank is enclosed as in FIG. 1, gases may pass out through exhaust pipe 34. In the meanwhile, gathering of snow may have been started and snow loading, such as blowing, begun through pipe 32. As the snow comes in tangentially to the upper dome-like section 28 of the melter hood, a swirling and diffusing effect will be realized upon it, and the snow will fall with fairly uniform distribution toward the water in the melting chamber. Dome 30 may be removed when snow is dumped directly into the tank.

As the snow descends, it will meet the turbulent water and the rising combustion gases. The lower end of gas exhaust pipe 34 is below the inner end of snow blower inlet pipe 32 to keep snow from being entrained and swept directly out by the gases. Initially at the points of meeting, the combustion gases may be warmer than the snow, although they normally will have been substantially cooled, in fact approximately to water temperature, while passing through the water in chamber 20. Accordingly, a certain, usually small, amount of heat transfer will take place from gas directly to snow. The major heat transfer to the snow, however, will take place when the snow strikes the water and is wetted thereby.

As the snow melts and itself becomes water, the liquid level in chamber 20 will tend to rise, but will be prevented from going above the operating level as the draw-off pipe 38 operates to remove the equivalent of the snow being fed to the melter. This water of melting is discharged through nozzle 46 at a distance and in a direction from the vehicle determined by the adjustment of struts 50 or through supplemental hose connections, etc.

The foregoing process preferably is continuous, assuming that the vehicle bearing the snow melter and auxiliary apparatus and that carrying the snow gathering and blowing equipment advance down the roadway to be cleared. Snow is blown into the melter through pipe 32 or dumped in the open tank if preferred; air and oil are fed to the combustors 52, and combustion gas bubbles heat the water body 56, which in turn heats and melts the snow; gases escape through pipe 34 slightly preheating the incoming snow if they carry residual heat, and water overflows through pipe 36. The greater the rate of snow feed, the greater the rate at which individual combustors will be fired or the greater the number of combustors that will be put into service. In this case, as in all others, some heat will enter the water by conduction from the walls of flue 54, but this effect will be minor (usually less than 2% of transferred heat) compared with the heat released to the water by mixing with the gas bubbles. The highly turbulent water rolls and splashes up around burner elements 54, 59, etc., and effectively keeps them from overheating, even at oil flame temperatures which may be as hot as 3000° F. or higher, and seldom below at least 1600° F.

The snow melter of this invention as depicted in FIG. 1 may be operated without the hood structure 26 and attached piping. With the hood removed, snow gathering equipment will discharge directly into melting chamber 20, and combustion gases will rise directly off surface 40 into the atmosphere. To the extent possible, it will be desirable to have the gathering equipment discharge snow that is loose rather than tightly compacted, and with uniformity across the access opening of the melting chamber. It will be appreciated that with the hood removed, an extremely violent release of gas bubbles into the heat transfer liquid of chamber 20 may tend to blow the water out of the chamber and disrupt the orderly process of heat transfer from gas to water to snow. Prevention of this effect may be achieved by proper design of the gas bubble generating and distributing means, and by proper regulation of air pressure at the combustors.

Figure 2:
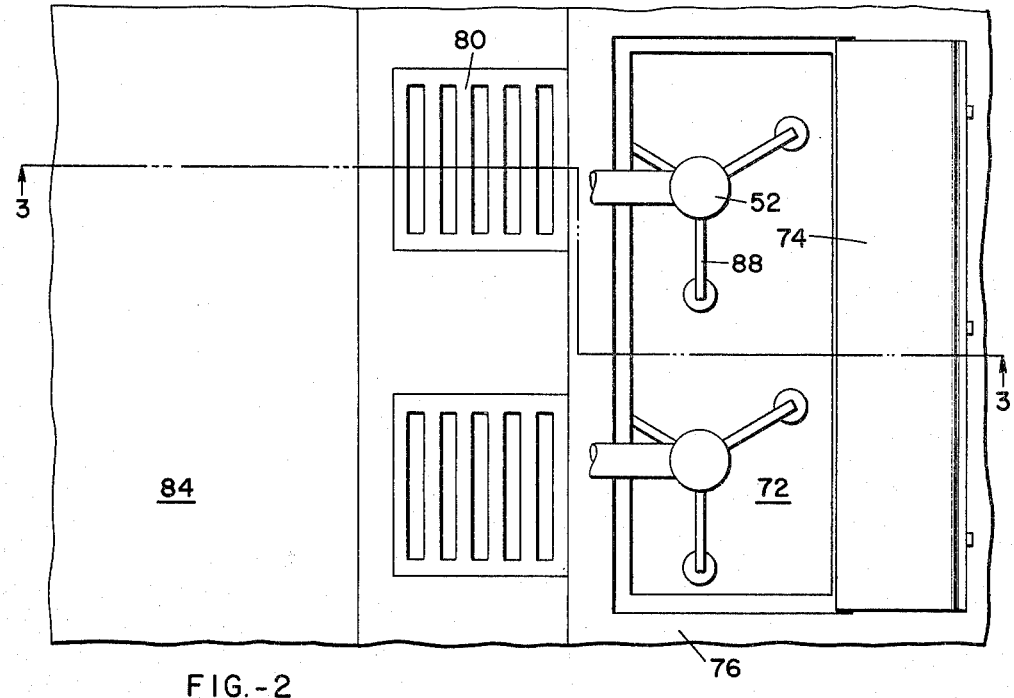
FIG. 2 represents a plan view of a sewer and catch basin facility provided with combustor and combustion gas distribution equipment for melting snow according to the method of this invention.
Figure 3:
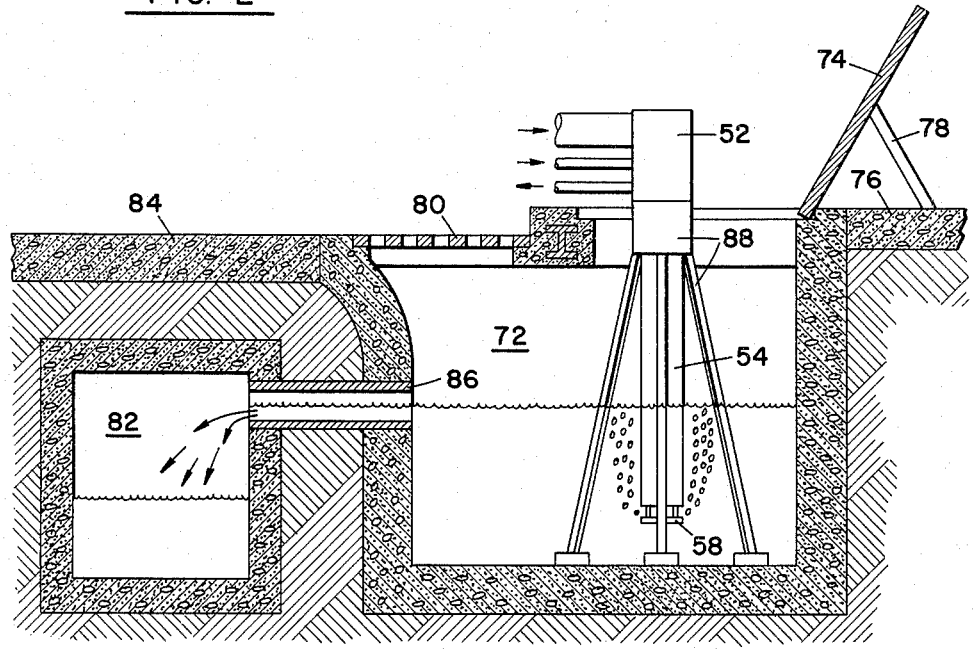
FIG. 3 represents a view in sectional elevation along line 3—3 of FIG. 2 showing further details of the combustor and combustion gas distribution equipment installation in the sewer and catch basin facility.

Referring now to FIGS. 2 and 3, instead of transporting the apparatus shown in FIG. 1 from place to place for snow melting according to the method of this invention, it may be convenient, e.g., in large cities, to have permanent underground facilities in which one or more heating units can be installed temporarily as needed. For such installations, 72 designates a catch basin formed with its floor below the street and sidewalk level. This basin is provided with a hinged or otherwise tiltable lid 74 set in an appropriate structure such as the sidewalk 76 which may be supported in open position by braces 78 or other appropriate means. Access to the basin is provided also by gutter gratings 80 of the conventional type. A main sewer line 82 runs below street paving 84, e.g., parallel with the street and sidewalk. Communication between catch basin and sewer is by means of at least one lateral passage 86.

When catch basin 72 is used for snow melting, a typical combination of combustor 52, flue 54, and gas deflection plate 58 may be set in the basin on a temporary mounting. A ring and tripod support 88 for this purpose is illustrated. Depending upon the size of the catch basin, a number of heating units greater than one may be installed therein. The air and oil supply and return lines of the combustor may be connected singly or in combination with appropriate auxiliary equipment, not shown.

The lateral passage or passages 86 will establish a water level in the catch basin. Snow may be thrown or pushed into the basin by any appropriate means. The basin lid 74 may be used as a back-up member against which snow gathering means may discharge their loads. The combustors will be fired and hot gases discharged from flues 54 in the usual way to warm and also to circulate the heat transfer water body in the basin for melting the incoming snow. Water of melting will overflow through passage 86 to enter sewer 82 for ultimate disposal. The gases of combustion will escape from the basin through gratings 80, and the main aperture uncovered by raising of lid 74.

Figure 4:
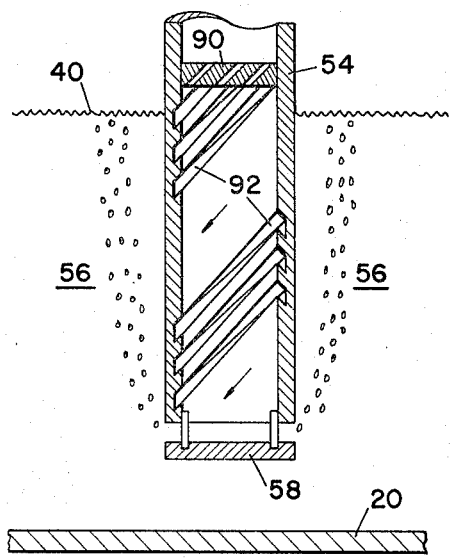
FIG. 4 represents a view in sectional elevation through a combustion gas flue provided with an internal perforated plate for damping pressure surges at the combustor flame upon gas bubble release.

Referring now to FIG. 4, before a gas bubble can escape from the flue 54, there must be sufficient pressure existing in the flue to overcome the static fluid head between liquid surface 40 and the point of bubble escape. When a bubble is finally released, particularly a large one, there will be drop in pressure in the flue causing a lengthening of the combustor flame. Erratic or intermittent large volume bubble release may cause pressure surges in the flue of sufficient magnitude to impair flame stability. Such surges can be reduced at the combustor, and bubble size controlled in a degree, by providing a throttling device in the flue.

According to FIG. 4, a perforated plate 90 is installed transversely in flue 54. This plate is shown above the limiting liquid level 40. During firing of the combustor, plate 90 will become extremely hot and should not be cooled suddenly by water flooding back on it when firing ceases. The plate may be of ceramic or other material capable of resisting flame temperatures without substantial deformation.

The perforations in plate 90 will act as throttling orifices to damp pressure surges in the flue tending to flow back to the combustor flame. These orifices may be axial with the flue for simplicity, or they may be helically inclined to the flue axis to provide swirl to the combustion gases. In addition, flue 54 may itself be cut with an internal spiral groove or grooves 92 to enhance gas swirl and provide better bubble ejection conditions.

Action of plate 90 to throttle the combustion gas flow will, of course, be effective in both directions. With this plate in place, air for the combustor must be supplied at a higher pressure than would be necesary otherwise for a given firing rate, depth of flue immersion, and aperture between the end of the flue and deflector plate 58. It should be understood that perforated plate 90 of FIG. 4 is an exemplary throttling means only. Numerous other means may be used such as ceramic chunk packing retained between screens above liquid level 40, or simply a formed orifice region in the flue.

Figure 5:
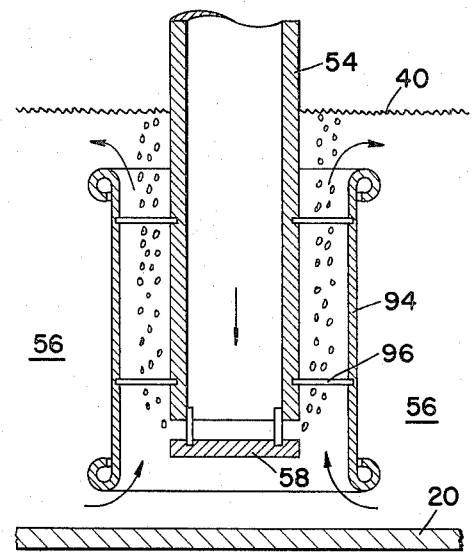
FIG. 5 represents a view in sectional elevation through a combustion gas flue provided with an external draft tube for improving mixing of combustion gases with the surrounding water.

Referring now to FIG. 5, the utility of this invention will be enhanced as intimacy of mixing of combustion gas bubbles with heat transfer water in a melting chamber is increased, and this can be effected by a draft tube in connection with the combustor flue. In FIG. 5 such a tube 94 is held in spaced, surrounding relation to flue 54 by struts 96 which will offer negligible resistance to the flow of fluids in the annular space between the flue and the tube. Draft tube 94 must stop short of the limiting liquid level 40, and desirably will extend somewhat below gas deflecting plate 58.

Hot gas bubbles leaving the flue will rise toward surface 40 within the draft tube. The warmth of the bubbles and their reduced density compared with water will create a relatively light column of fluid between the draft tube and the flue. Circulation as indicated by arrows will be set up around the draft tube as the result of hydrostatic unbalance. Warm water will flow over the tube, and relatively cooler water will be drawn in under tube 94 for warming. By this circulation a mixing effect will be achieved in the main body of water 56, and heat from the gas bubbles transferred throughout it.

Figure 4A:
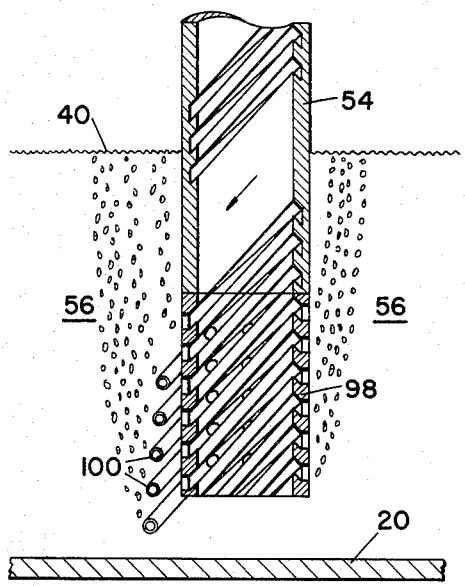
FIG. 4A shows a flue having extension tubes for gas bubble release.
Figure 6:
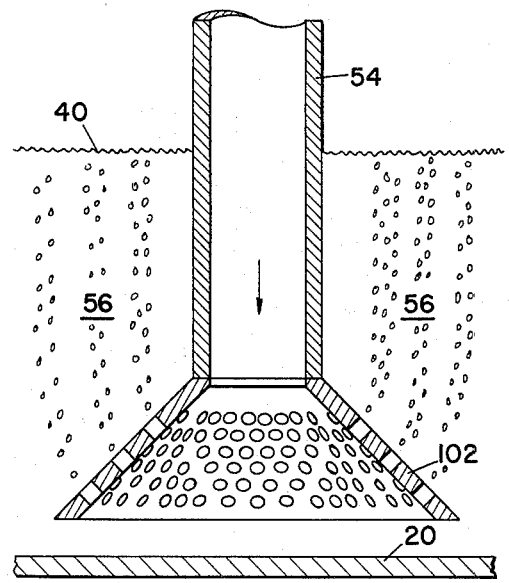
FIG. 6 represents a view in sectional elevation through the lower end of a combustion gas flue provided with a perforated cone for generating and distributing gas bubbles.

Refer now to FIG. 6. This shows flue 54 provided with a gas bubble generator-distributor 102 which is in the form of an outwardly-flaring, perforated cone. An advantage of this design compared with the simple tubular generator-distributor 98 having extension tubes 100 of FIG. 4A, is that it achieves, by itself, a wider distribution of gas bubble patterns in the heat transfer water 56. Other means of influencing gas flow and bubble release disclosed already in connection with FIG. 4, such as internal grooving, tangential perforations, and perforation extension tubes may be carried over to the flue and conical generator-distributor arrangement of FIG. 6 as desired.

Refer now to FIG. 7. This shows another means for generating bubbles of combustion gas and distributing them into the heat transfer water body 56 of the snow melter of this invention. In the illustrated embodiment this means, called a sparger, comprises a perforated ring 104, a closing fitting 106 for the lower end of flue 54, and a plurality of tubes 108 connecting the ring and fitting. Combustion gases flow outwardly through tubes 108 into ring 104 and then are formed into bubbles in and released into water body 56 through the ring perforations.

It is evident that a series of concentric rings could be fed by radial tubes extending from ring to ring, and that the sparger could take the form of a spiral winding away from the flue in flat or conical aspect. Numerous other sparger configurations would be possible. In general, however, the sparger will have the advantage of providing considerable surface for bubble-forming perforations while allowing a rather low limiting liquid level 40 to be maintained. Lowering of level 40 will tend to allow more compact construction of the snow melter of this invention.

Figure 8:
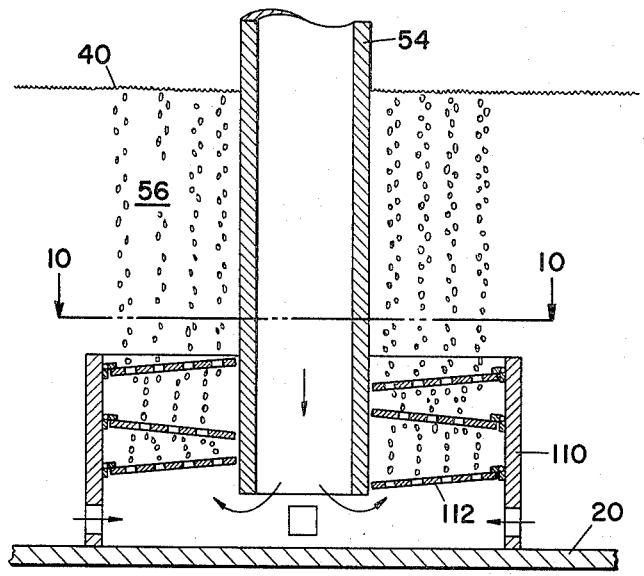
FIG. 8 represents a view in sectional elevation through the lower end of a combustion gas flue provided with an external, separately mounted array of perforated and sensibly flexible plates for generating and distributing gas bubbles and producing local agitation of the surrounding water.
Figure 9:
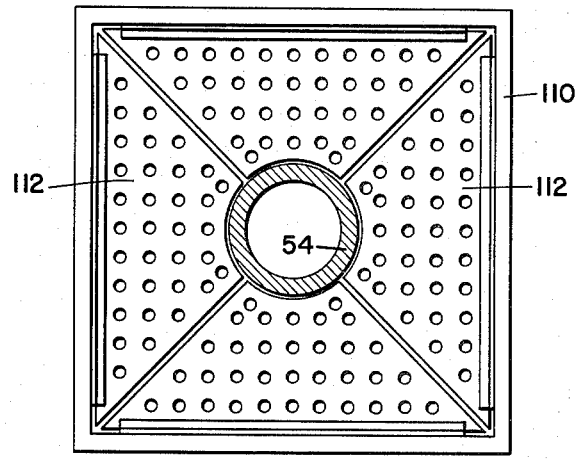
FIG. 9 represents a view in sectional plan along line 9—9 of FIG. 8 showing further details of the flexible plate array provided at the lower end of the combustion gas flue.

Refer now to FIGS. 8 and 9. In these the combustor flue 54 does not have any gas bubble generating and distributing means attached to its directly. Surrounding the lower end of the flue, but with appreciable spacing from it, is a frame 110. In this frame are mounted stacks of perforated plates 112 which fit quite closely to flue 54. The attachments of individual plates 112 to frame 110 are of a hinged or quasi-flexible nature, so that the plates may rotate through limited arcs with respect to the frame, either because the attachments are actually restricted hinges or the plates are held only along an edge and are so far unsupported that they may flex as cantilevers. Frame 110 is itself provided with a few perforations near the bottom of the melting chamber and below the lower end of flue 54.

Combustion gases will escape from the bottom of the flue 54 as rather large bubbles. In rising, these bubbles will, for the most part, have to pass through the perforations of plates 112. By appropriate choice of dimensions for perforations in these plates, bubbles of appreciably reduced size and therefore of favorable surface to volume ratio may be generated. The perforations in succeeding plates of any stack may be staggered to provide a more tortuous bubble path and, therefore, a more intimate mixing of gas and water. The perforations in frame 110 will insure that the lower end of flue 54 and the perforated plates 112 are kept flooded. It may be seen that frame 110 will provide a draft tube effect similar to that described in connection with FIG. 5.

In addition to plates 112 having an effect on the combustion gases leaving flue 54 to generate bubbles of small size, the gases themselves will have a significant effect on the plates as they impinge on them with some violence. If the plates be considered substantially rigid and their attachment to frame 110 of a restrictively hinged nature, the plates will swing upward a short ways upon being struck by gases from below, and then swing downward under the influence of gravity. Such motion of the plates will stir the surrounding water to effect further mixing of gas and water, and more rapid transfer of heat from the former to the latter.

Considering the other possibility, cantilever attachment of plates which are sensibly flexible in themselves, gas impact will bend the plates upward and then elastic forces will flex them downward to stir the water. In any particular snow melter, such plates might be tuned for a selected firing rate of the combustor to provide intense flutter or vibration.

Refer now to FIG. 10. In this illustration the lower end of combustor flue 54 is fitted with a gas bubble generator and distributor in the form of a horizontal, perforated plate 114 which extends a considerable distance from the flue in all convenient directions. Desirably generator-distributor 114 will be formed with a skirt as shown. Closely fitting walls of a melting chamber will serve the function of a skirt.

Large bubbles of gas emanating from the lower end of flue 54 will be obliged to rise through the perforations of plate 114 and be broken into a greater number of smaller bubbles. The skirt on plate 114 will prevent any substantial edgewise escape of gas around the plate, while allowing adequate clearance between plate 114 and the bottom of the melting chamber for substantially unthrottled gas flow up to the perforations.

Generator-distributor plate 114 may be extended, and the sizes and locations of its bubble-forming perforations selected to give bubble discharge patterns as fine and widespread as may be desired. The particular advantage of the arrangement of FIG. 10 is that it will allow quite a low water level 40 to be carried in the melting chamber, and, as noted earlier in connection with the sparger generator-distributor, this will tend to permit more compact construction of the snow melter of this invention.

Refer now to FIG. 11. This represents the gas bubble generating and distributing means of FIG. 10 in combination with mechanism for producing gas bubbles of further reduced size. The stationary perforated plate 114 is surmounted in closely spaced relation by a second perforated plate 116 intended to be rotated with respect to 114. Plate 116 is attached to sleeve 118 surrounding flue 54. The sleeve and plate assembly are supported on and guided by bearings 120 and 122 which may be of hard rubber or other material capable of functioning as a bearing while submerged.

There should be perforations in sleeve 118 or other appropriate provision for allowing water to reach these bearings for cooling purposes, because the bearings will tend to be heated not only by running friction, but also by conduction from hot gases through the wall of flue 54. At its upper end, above liquid level 40, sleeve 118 is provided with a sheave 124 around which passes belt 126. This belt transmits power from output pulley 128 of electric motor 130 which is mounted on the outside of the melting chamber.

Bubbles formed in the perforations of plate 114 must pass through plate 116 to escape finally into water body 56. Accordingly the perforations in plate 116 must have radial overlap with those in plate 114. As plate 116 is rotated by the driving means shown, a bubble formed in and beginning to extend beyond any perforation in plate 114 after the leading edge of a perforation in plate 116 has passed, will be sliced off by the trailing edge of the perforation in the rotating plate and a bubble of reduced size released therefrom.

It is contemplated that the snow melter of this invention may be operated on uneven ground or aboard a vehicle resting on an inclined roadway. Such conditions will tend to affect the amount and aspect of heat transfer water maintainable in the melting chamber in the absence of precautionary baffling of this chamber. In the figure vertical baffles for a typical melting chamber 1 are designated 132. These baffles are nonpermeable, and, in effect, divide the melting chamber into a plurality of distinct, altogether separate compartments 4, 5 and 6. Each one of these compartments will be equipped with at least one combustion heating unit 7, 8 and 9 and water draw-off means 10, 11 and 12.

The significance of the baffling is that even with considerable tilt of the melting chamber 1 no combustor will be immersed nor the discharge openings from any flue 13, 14 and 15 or gas bubble generator-distributor left out of water. All hot gas producing units may continue to be fired, and all gas generated will enter heat transfer water to be usefully applied.

The intervals at which baffles are spaced will depend upon overall dimensions of the melting chamber and the degree of tilt anticipated. The need for baffling may be comprehended particularly by considering a melting chamber having an appreciably long dimension as in the case of a snow melter constructed to occupy substantially the full bed of a highway trailer. Whenever baffles are used in any melter, care must be taken in feeding the melter with snow to insure that there is fairly even distribution thereof across all compartments in which heating units are being fired.

Refer now to FIG. 12. Two embodiments of this invention having heating units and melting chambers configured generally according to those illustrated in FIG. 1 have been constructed and operated. One is rated at 40,000 B.t.u./hr. thermal input, being fired with propane and oxygen. The second and larger embodiment is rated at 400,000 B.t.u./hr., being fired with oil and air. FIG. 12 is a schematic apparatus and piping diagram for this second embodiment. Various measured and calculated quantities obtained through operation of these apparatus embodiments will be set forth in tabular form.

Except for the values to be given in Table VI, all test data and computed results presented for the smaller embodiment relate to operation with a gas bubble generator-distributor of cylindrical form similar to 102 in FIG. 6, having an inside diameter of ½-inch and 16 perforations each of ⅛-inch diameter. The values of Table VI relate to operation with a flat plate generator-distributor similar to 114 in FIG. 10, having an outside diameter of 6 inches and 466 perforations each of 5/64-inch diameter. In the case of the larger embodiment, all data and results relate to operation with a cylindrical generator-distributor having an outside diameter of 6 inches and 210 perforations each of ¼-inch diameter.

In all tables where it appears, volumetric heat transfer rate has been computed as the heat transferred per unit time per unit volume of water in the melting chamber. The actual liquid volume present in the smaller embodiment ranged from 0.01558 to 0.01766 ft.$^3$ except in the case of operations summarized in Table VI, for which it was 0.00425 ft.$^3$. In the larger embodiment 1.80 ft.$^3$ of liquid were present for all operations.

Referring now to the operating results, Table I represents data on the heating of water in the smaller apparatus embodiment.

Table II represents data on the heating of water in the larger apparatus embodiment.

Table III represents data on the melting of crushed ice in the larger apparatus embodiment.

Table IV represents data on the melting of wet snow in the smaller apparatus embodiment.

Table V represents comparative data on the melting of crushed ice and dry snow in the smaller apparatus embodiment.

Table VI represents data on the heating of water in the smaller apparatus embodiment.

TABLE I
*Small laboratory unit*

| Propane Firing Rate | | Water Flow Rate (Gal./Hr.) | Water Inlet Temp. (° F.) | Water Outlet Temp. (° F.) | Heat Transferred to Water (B.t.u./Hr.) | Heat Trans. Efficiency (percent) | Volumetric Heat Transfer Rate (B.t.u./Hr. Ft.$^3$) |
|---|---|---|---|---|---|---|---|
| Ft.$^3$/Hr. | B.t.u./Hr. | | | | | | |
| 4.31 | 10,420 | 11.66 | 70 | 165 | 9,180 | 88.0 | 590,000 |
| 6.12 | 14,800 | 16.48 | 69 | 170 | 13,900 | 94.0 | 803,000 |
| 17.28 | 41,800 | 56.5 | 52 | 135 | 39,000 | 93.3 | 2,210,000 |

TABLE II
*Large laboratory unit*

| Oil Firing Rate | | Water Flow Rate (Gal./Hr.) | Water Inlet Temp. (° F.) | Water Outlet Temp. (° F.) | Heat Trans. to Water (B.t.u./Hr.) | Heat Transfer Efficiency (percent) | Volumetric Heat Trans. Rate (B.t.u./Hr. Ft.$^3$) |
|---|---|---|---|---|---|---|---|
| Gal./Hr. | B.t.u./Hr. | | | | | | |
| 3.45 | 481,000 | 500 | 45 | 140 | 396,000 | 82.5 | 220,000 |
| 3.54 | 496,000 | 603 | 45 | 130 | 427,000 | 86.0 | 237,000 |
| 3.50 | 490,000 | 655 | 45 | 120.5 | 420,000 | 85.7 | 233,000 |
| 3.36 | 470,000 | 838 | 45 | 106 | 425,000 | 90.3 | 236,000 |
| 3.54 | 496,000 | 1,241 | 45 | 90 | 465,000 | 93.8 | 258,000 |

TABLE III

| Ice Supply and Melting Rate (Tons/Hr.) | Water Outlet Temp. (° F.) | Heat Trans. to Ice and Water (B.t.u./Hr.) | Volumetric Heat Trans. Rate (B.t.u./Hr. Ft.$^3$) |
|---|---|---|---|
| 0.510 | 125 | 242,000 | 134,000 |
| 0.765 | 95 | 316,000 | 175,000 |
| 1.53 | 45 | 472,000 | 262,000 |

TABLE IV

| Propane Firing Rate | | Snow Supply and Melting Rate (Lbs./Hr.) | Water Outlet Temp. (° F.) | Heat Transferred to Snow and Water (B.t.u./Hr.) | Heat Transfer Efficiency (percent) | Volumetric Heat Trans. Rate (B.t.u./Hr. Ft.$^3$) |
|---|---|---|---|---|---|---|
| Ft.$^3$/Hr. | B.t.u./Hr. | | | | | |
| 12.73 | 30,850 | 209.0 | 68 | 27,150 | 88 | 762,000 |
| 7.82 | 18,950 | 156.5 | 48 | 17,250 | 91 | 483,000 |
| 5.30 | 12,850 | 52.8 | 158 | 11,620 | 0.05 | 326,000 |

TABLE V

| Substance Melted | Heat Transfer Water Temp. (° F.) | Melting Time (Sec.) |
|---|---|---|
| Snow | 123 | 9.5 |
| Ice | 116 | 22 |
| Ice | 86.5 | 36 |
| Snow | 78 | 20 |

TABLE VI

| Propane Firing Rate | | Water Flow Rate (Gal./Hr.) | Water Inlet Temp. (° F.) | Water Outlet Temp. (° F.) | Heat Trans. to Water (B.t.u./Hr.) | Heat Transfer Efficiency (percent) | Volumetric Heat Transfer (B.t.u./Hr. Ft.³) |
|---|---|---|---|---|---|---|---|
| Ft.³/Hr. | B.t.u./Hr. | | | | | | |
| 18.80 | 45,500 | 55.3 | 52 | 145 | 42,800 | 94.2 | 10,620,000 |

While the foregoing data are largely self-explanatory and generally indicative of the high thermal efficiencies and volumetric heat transfer rates obtainable in snow melters constructed according to this invention, particular comment may be directed to Tables III, V and VI.

Ice melting was considered to represent a more severe test of the method of this invention because of the lower surface/volume ratio which may be expected for a given weight of ice compared with the same weight of snow. For this reason the comparatively low volumetric heat transfer rates appearing in Table III are not considered remarkable. In line with the foregoing, the data of Table V which were gathered using constant agitation of the mixture of heat transfer water and substance being melted show that dry snow melts approximately twice as fast as crushed ice for a given temperature of surrounding water body.

It follows that when melting equipment is to be tested and no snow is conveniently available, ice may be used as the material for melting and the test results projected with fair accuracy for the case of snow. In actual practice, the capacity of the snow melter of this invention, particularly in an embodiment generally similar to that of FIG. 1, may be determined primarily by the ambient air temperature at the point of operation. This is because water resulting from snow melting must remain liquid long enough to get into a flowing sewer system or other disposal region; that is, the water must not turn into ice prior to disposal. Obviously, the farther the ambient temperature is below the freezing point, the higher must be the water outlet temperature from the melting chamber and the lower the capacity of the melter for a given firing rate.

The data of Table VI should be compared with those of the third run of Table I since the values of propane firing rate, water inlet temperature, and heat transfer efficiency for the two cases are quite close. What are widely different are the values of volumetric heat transfer rate, that of Table VI being more than four and one-half times that of the third run of Table I. This difference is due to the finer and more widespread pattern of combustion gas bubbles in the water to be heated obtained with the horizontal perforated plate generator-distributor used for the test summarized in Table VI.

Besides apparatus embodiments generally similar to that of FIG. 1, the snow melting method of this invention has been used in a catch basin melter installation corresponding to that of FIGS. 2 and 3. The basin was 12' long by 5' wide by 5' deep, and drawoff means maintained a depth of heat transfer water of 3' providing a water body of 1,350 gal. Two oil-fired heating units were used, each rated at 4,000,000 B.t.u./hr. The flues were of 1' inside diameter with a submergency of 2'. Bubble generating and distributing means comprised simple deflecting plates similar to 58 in FIG. 3 at the lower ends of the flues. In a test of this equipment with the heating units operating at 52% of capacity, wet snow was melted at the rate of 25 tons/hr., and water outlet temperatures were in the range of 35°–45° F.

What is claimed is:
1. An apparatus for melting congealed water, said apparatus comprising:
   (a) a container having bottom and side wall portions,
   (b) water withdrawing means in said container whereby a limiting water surface level may be maintained in said container,
   (c) at least one combustor unit supported in spaced relation to said container above the limiting surface level maintained by said water withdrawing means,
   (d) a flue element extending downwardly from each said combustor unit below said limiting water surface level,
   (e) a hood of dome-like configuration surmounting said container,
   (f) a pipe member penetrating said hood tangentially wherethrough congealed water may be supplied to said container, and
   (g) a pipe member extending substantially vertically through said hood wherethrough gaseous products of combustion may escape from said container.

2. An apparatus for melting congealed water on uneven ground, said apparatus comprising (1) a container having bottom and side wall portions, (2) at least one impermeable baffle member which is substantially vertical with respect to said bottom and within said container whereby said container is divided into at least two compartments, said compartments being of substantially the same area, (3) water withdrawing means in each of said compartments wherein the intakes of said means are positioned a distance above the container bottom and below the upper edge of said vertical baffle member whereby a limiting water surface level may be maintained in each of said compartments, (4) at least one combustor unit associated with each of said compartments, said combustor unit being positioned above the top edge of said vertical baffle member and supported in spaced relation to said container above the limiting water surface level in that compartment wherewith it is associated, and (5) a flue element extending downwardly from each of said combustor units below the limiting water surface level in each of said compartments wherewith said combustor units are respectively associated.

3. An apparatus of the character described comprising, in combination,
   (a) a water tank adapted to receive congealed water, such as snow and ice, to be melted therein, said tank having an open top,
   (b) water withdrawing means in said tank for maintaining water of substantial depth to a normal level and for discharging water as it accumulates to said normal level, (c) at least one combustor unit mounted within the upper part of said tank and close to said normal water level therein, (d) a single large flue element extending directly downwardly from said combustor unit to a level substantially below said normal water level so as to discharge the total gaseous combustion products from said combustor unit into the water in said tank, and (e) means at the bottom of said flue element for breaking up the gaseous combustion products into bubbles of such size as to transmit at least 90 percent of their heat above water temperature to said water before emerging from the water surface.

4. Apparatus according to claim 3 wherein the tank is incorporated into a mobile vehicle.

5. Apparatus according to claim 3 wherein the tank is incorporated into a catch basin.

References Cited by the Examiner

UNITED STATES PATENTS

| | | | |
|---|---|---|---|
| 595,072 | 12/97 | Smith | 126—343.5 |
| 663,718 | 12/00 | Beatty | 126—343.5 |
| 1,098,950 | 6/14 | McGuire | 126—343.5 X |
| 1,242,433 | 10/17 | Friedman | 126—343.5 X |
| 1,388,027 | 8/21 | Connolly | 126—343.5 |
| 1,572,414 | 2/26 | Wilbert | 126—343.5 X |
| 2,233,675 | 3/41 | Norten | 126—360 |
| 2,594,433 | 4/52 | Hess et al. | 126—360 |
| 2,638,895 | 5/53 | Swindin | 126—360 |
| 2,729,000 | 1/56 | Bros et al. | 126—343.5 X |
| 2,900,975 | 8/59 | Northcott | 126—360 |

JAMES W. WESTHAVER, *Primary Examiner.*

FREDERICK L. MATTESON, JR., *Examiner.*